(12) United States Patent
Gerard et al.

(10) Patent No.: US 10,294,358 B2
(45) Date of Patent: *May 21, 2019

(54) IMPREGNATION PROCESS FOR A FIBROUS SUBSTRATE, A LIQUID (METH) ACRYLIC SYRUP FOR THE IMPREGNATION PROCESS, ITS METHOD OF POLYMERIZATION AND STRUCTURED ARTICLE OBTAINED THEREOF

(71) Applicant: Arkema France, Columbes (FR)

(72) Inventors: Pierre Gerard, Denguin (FR); Jean-Pierre Cauchois, Obersteinbach (FR); Gilles Hochstetter, L'Hay les Roses (FR); Michel Glotin, Saint-Cloud (FR); Camille Perrin, Pontoy (FR); Gilles Francois, Procelette (FR)

(73) Assignee: Arkema France, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/414,732

(22) PCT Filed: Jul. 18, 2013

(86) PCT No.: PCT/EP2013/065218
§ 371 (c)(1),
(2) Date: Jan. 14, 2015

(87) PCT Pub. No.: WO2014/013028
PCT Pub. Date: Jan. 23, 2014

(65) Prior Publication Data
US 2015/0218362 A1    Aug. 6, 2015

(30) Foreign Application Priority Data

Jul. 18, 2012  (FR) .................... 12 56929

(51) Int. Cl.
| | | |
|---|---|---|
| *B29C 70/48* | (2006.01) | |
| *C08L 33/12* | (2006.01) | |
| *C08F 265/06* | (2006.01) | |
| *C08J 5/24* | (2006.01) | |
| *D06M 13/203* | (2006.01) | |
| *D06M 15/263* | (2006.01) | |
| *B29B 15/12* | (2006.01) | |
| *B29K 33/00* | (2006.01) | |

(52) U.S. Cl.
CPC .............. *C08L 33/12* (2013.01); *B29C 70/48* (2013.01); *C08F 265/06* (2013.01); *C08J 5/24* (2013.01); *D06M 13/203* (2013.01); *D06M 15/263* (2013.01); B29B 15/122 (2013.01); B29K 2033/08 (2013.01); C08J 2333/06 (2013.01)

(58) Field of Classification Search
CPC ...... C08L 33/12; C08K 7/14; C08J 5/24; C08J 5/04; C08J 5/042–5/046; Y10T 442/277; Y10T 442/2861; Y10T 442/2934; Y10T 442/2992

See application file for complete search history.

(56) References Cited

U.S. PATENT DOCUMENTS

| | | | | |
|---|---|---|---|---|
| 2,961,364 A | * | 11/1960 | Smith ................. | B29C 70/12 156/334 |
| 3,509,002 A | * | 4/1970 | Edwards ............. | B29C 70/00 296/901.01 |
| 3,789,051 A | * | 1/1974 | Rees .................. | C08F 257/02 524/432 |
| 3,827,933 A | * | 8/1974 | Duggins ............. | C04B 26/06 264/331.18 |
| 4,344,906 A | * | 8/1982 | Kitagawa ........... | C08F 257/00 264/128 |
| 4,885,125 A | * | 12/1989 | Kato .................. | B29C 67/246 264/1.1 |
| 6,191,229 B1 | | 2/2001 | Sasabe et al. | |
| 6,734,249 B1 | | 5/2004 | Bulluck et al. | |
| 2010/0121097 A1 | | 5/2010 | Sasaki et al. | |
| 2014/0256850 A1 | | 9/2014 | Gerard et al. | |

FOREIGN PATENT DOCUMENTS

| | | | | |
|---|---|---|---|---|
| FR | 1374046 | | 10/1964 | |
| GB | 907261 A | * | 10/1962 | ............ C08F 220/14 |
| JP | 9085841 | | 3/1997 | |

OTHER PUBLICATIONS

Hammami et al, Polymer Composites, 2000, p. 28-40.*

* cited by examiner

*Primary Examiner* — Satya B Sastri
(74) *Attorney, Agent, or Firm* — Thomas F. Roland

(57) ABSTRACT

The present invention relates to an impregnation process for a fibrous substrate, a liquid composition for implementing this process and the obtained impregnated fibrous substrate. The impregnated fibrous substrate is suitable for manufacturing mechanical or structured parts or articles. In particular the present invention deals with an industrial process for impregnating a fibrous substrate or long fibers with a viscous liquid composition containing mainly methacrylic or acrylic components. This viscous composition is called hereafter liquid (meth) acrylic syrup. The invention concerns also a fibrous substrate pre-impregnated with said syrup which is useful for manufacturing mechanical or structured parts or articles. More particular the impregnation of fibrous substrate with the (meth) acrylic syrup is achieved in a closed mold. The present invention concerns also manufacturing process for manufacturing mechanical or structured parts or articles and three-dimensional mechanical or structured parts obtained by this process.

16 Claims, No Drawings

IMPREGNATION PROCESS FOR A FIBROUS SUBSTRATE, A LIQUID (METH) ACRYLIC SYRUP FOR THE IMPREGNATION PROCESS, ITS METHOD OF POLYMERIZATION AND STRUCTURED ARTICLE OBTAINED THEREOF

This application claims benefit, under U.S.C. § 119 or § 365 of PCT Application Number PCT/EP2013/065218, filed Jul. 18, 2013, and French Patent Application Number FR 1256929, filed Jul. 18, 2012.

FIELD OF THE INVENTION

The present invention relates to an impregnation process for a fibrous substrate, a liquid composition for implementing this process and the obtained impregnated fibrous substrate. The impregnated fibrous substrate is suitable for manufacturing mechanical or structured parts or articles.

In particular the present invention deals with an industrial process for impregnating a fibrous substrate or long fibers with a viscous liquid composition containing mainly methacrylic or acrylic components. This viscous composition is called hereafter liquid (meth) acrylic syrup. The invention concerns also a fibrous substrate pre-impregnated with said syrup which is useful for manufacturing mechanical or structured parts or articles.

More particular the impregnation of fibrous substrate with the (meth) acrylic syrup is achieved in a closed mould.

The present invention concerns also manufacturing process for manufacturing mechanical or structured parts or articles and three-dimensional mechanical or structured parts obtained by this process.

Technical Problem

Mechanical or structured parts or articles that have to absorb high stresses during their use are widely manufactured from composite materials. A composite material is a macroscopic combination of two ore more non miscible materials. The composite material constitutes at least of a matrix material that forms a continuous phase for the cohesion of the structure and a reinforcing material with various architectures for the mechanical properties.

The aim in using composite materials is to achieve a performance from the composite material that is not available from its separate constituents if used alone. Consequently composite materials are widely used in several industrial sectors as for example building, automotive, aerospace, transport, leisure, electronics, and sport notably due to their better mechanical performance (higher tensile strength, higher tensile modulus, higher fracture toughness) in comparison with homogenous materials and their low density.

The most important class in view of volume in commercial industrial scale, are composites with organic matrices, where the matrix material is a generally polymer. The principal matrix or continuous phase of a polymeric composite material is either a thermoplastic polymer or a thermosetting polymer.

Thermosetting polymers consist of crosslinked three dimensional structures. The crosslinking is obtained by curing reactive groups inside the so called prepolymer. Curing for example can be obtained by heating the polymer chains in order to crosslink and harden the material permanently.

In order to prepare the polymeric composite material the prepolymer is mixed with the other component such as glass beads or fibres or the other component which is wetted or impregnated and cured afterwards. Example for prepolymers or matrix material for thermoset polymers are unsatured polyesters, vinylesters, epoxy or phenolic ones.

A major disadvantage of a thermoset polymer matrix is its rigidity. The matrix cannot be easily shaped in other forms. Once the polymer has been cured the form is fixed. This makes also difficult the recycling of the thermoset composite material and manufactured mechanical or structured parts or articles comprising said thermoset composite material, which are burned in a cement plant or thrown into a waste dump.

Thermoplastic polymers consist of linear or branched polymers, which are not crosslinked. The thermoplastic polymers are heated in order to mix the constituents necessary for producing the composite material and to be cooled for setting. The limit in using thermoplastic polymers for the fabrication of composite materials is their high viscosity in the molten state in order to homogenously impregnating for example a fibrous substrate. The wetting or correct impregnation of the fibers by the thermoplastic polymer can only be achieved, if the thermoplastic resin is sufficiently fluid. In order to have a low viscosity or sufficient fluidity of the thermoplastic polymer the chain length or molecular mass shall be reduced. However a too low molecular weight has a negative impact on the performance of the composite material and on the mechanical or structured parts especially their mechanical properties as the deformation modulus.

Another way to reduce the viscosity in an important way of the thermoplastic polymer is to increase the temperature. Consequently the continuous working temperature is relatively high, above 200° C., increasing the economics costs of the composite material and mechanical or structured parts due to implication of high energy costs. Additionally thermoplastic polymers tend to degrade if the temperature is too high, which is especially true for semicrystalline thermoplastic polymers that have high melting points as for example polyamides such as PA6.6, polyethersulfon (PES), polyetherimid (PEI), polyetheretherketon (PEEK) or polyphenylene sulfide (PPS). This thermoinduced degradation yields to a decreasing molecular weight of the polymer matrix on the fibrous substrate important for the cohesion of the composite material and the mechanical or structured parts.

Another way for impregnating the fibrous substrate is to dissolve the thermoplastic polymer in an organic solvent. However this method requires a lot of solvent that has to be evaporated.

There are environmental issues in using large quantities of solvent in term of energy and pollution.

These are the limits or disadvantages for the preparation of thermoplastic composite materials especially with fibrous reinforcements, the impregnation process for a fibrous substrate and the manufactured mechanical or structured parts or articles comprising said thermoplastic composite material.

The objective of the present invention is to solve the disadvantages mentioned above.

One objective of the present invention is to have a structural part comprising a thermoplastic composite material with satisfying mechanical properties such as high stiffness and a young modulus of at least 15 GPa.

Another objective of the present invention is to have a structural part comprising a thermoplastic composite material with a satisfying UV resistance.

The further objective of the present invention is to have a structural part comprising a thermoplastic composite material that can be transformed and shaped into form due to a certain flexibility.

Still another objective of the present invention is to wet completely, correctly and in a homogenous way the fibrous substrate during impregnation. Any defects of fiber wetting for example by bubbles and voids decrease the mechanical performance of the structural part.

Another objective of the present invention is the recycling of the structural part including the composite material or structural parts that do not meet quality standards or worn-out structural parts. Under recycling is understood to recover at least a part of the used raw materials. This means grinding and reusing the thermoplastic polymer. This means also for example that the monomer from the thermoplastic matrix of the composite material can be recovered.

Another objective of the present invention is to provide a process which can be carried out at low cost and is capable of large-scale manufacturing, to produce the structural parts comprising the thermoplastic composite material of the invention. In addition, the process should be easy and simple to carry out using commercially available components. Also the manufacturing of parts should be reproducible and fast meaning short cycle times.

BACKGROUND OF THE INVENTION

Prior Art

The document FR1374046 describes a process of polymerization of acrylic monomers especially methacrylic monomers from monomer-polymer syrups using a metal catalyst based on tin. Glass fibres are impregnated with a methanol solution of the tin calatyst. Afterwards the fibres are impregnated with a monomer-polymer syrup and then the composition is polymerized. The process uses a metal catalyst and the impregnation and polymerization are not made in a closed mold or the same closed mold.

The document JP9085841 describes the preparation of a fabric base composite thermoplastic plastic member. A thermoplastic polymer is dissolved in a volatile solvent and mixed with the fabric base material. The solvent is evaporated and the prepreg is cut into shapes, then it is coated again with the solution of thermoplastic polymer in a solvent and cured by evaporation of the solvent. In the example a polymethylmethacrylate as thermoplastic polymer is dissolved at 15 wt % in a solvent mixture consisting of methanol, xylene, tetrahydrofyran in order to impregnate the fibrous material. This preparation method uses a lot of solvent that evaporates.

The document EP0796873 discloses a (meth)acrylic syrup, a process for for preparing the syrup and a process for preparing molding material containing the (meth)acrylic syrup. The main objective is having a syrup with excellent storage stability. The molding material might include a reinforcing material in form of fibres. However the mixing of the reinforcing material and the syrup is not made by impregnation process in a closed mold.

In the prior no impregnation process for impregnating a fibrous substrate is described where the fibrous substrate and the liquid (meth) acrylic syrup are brought into contact before the polymerization according to the present invention.

In the prior no manufacturing process for manufacturing mechanical or structured parts or articles is described including the impregnation process for impregnating a fibrous substrate with a liquid (meth) acrylic syrup and polymerization according to the present invention.

BRIEF DESCRIPTION OF THE INVENTION

Surprisingly it has been found that an impregnation process for impregnating a fibrous substrate, wherein said fibrous substrate is made of long fibres and said process comprises a step of impregnating said fibrous substrate with a liquid (meth) acrylic syrup comprising:
  a) a (meth)acrylic polymer,
  b) a (meth)acrylic monomer,
  c) at least one initiator or initiating system for starting the polymerization of the (meth) acrylic monomer, said liquid (meth)acrylic syrup has a dynamic viscosity of a value in the range from 10 mPa*s to 10000 mPa*s, preferably from 50 mPa*s to 5000 mPa*s and advantageously from 100 mPa*s to 1000 mPa*s yields to a complete and correct impregnation of the fibrous substrate.

Surprisingly it has also been discovered that an impregnation liquid (meth) acrylic syrup for implementing the impregnation process for a fibrous substrate, said liquid (meth) acrylic syrup comprises:
  a) a (meth)acrylic polymer,
  b) a (meth)acrylic monomer,
  c) at least one initiator or initiating system for starting the polymerization of the (meth) acrylic monomer, said liquid (meth)acrylic syrup has a dynamic viscosity of a value in the range from 10 mPa*s to 10000 mPa*s, preferably from 50 mPa*s to 5000 mPa*s and advantageously from 100 mPa*s to 1000 mPa*s yields to a complete and correct impregnation of the fibrous substrate.

Surprisingly it has also been discovered that a manufacturing process for manufacturing mechanical or structured parts or articles comprising following steps:
  a) impregnating a fibrous substrate with a liquid (meth) acrylic syrup,
  b) polymerising the liquid (meth) acrylic syrup impregnating said fibrous substrate
yields to manufactured mechanical or structured parts or articles having satisfying mechanical properties by possessing a high stiffness and a young modulus of at least 15 GPa.

Additionally it has also been discovered that a three-dimensional mechanical or structured parts obtained by the manufacturing process possessing a high stiffness and a young modulus of at least 15 GPa, has nearly no defects as voids between the fibrous substrate and the (meth)acrylic polymer.

DETAILED DESCRIPTION OF THE INVENTION

According to a first aspect, the present invention relates to an impregnation process for impregnating a fibrous substrate, wherein said fibrous substrate is made of long fibres and said process comprises a step of impregnating said fibrous substrate with a liquid (meth) acrylic syrup comprising:
  a) a (meth)acrylic polymer,
  b) a (meth)acrylic monomer,
  c) at least one initiator or initiating system for starting the polymerization of the (meth) acrylic monomer, said liquid (meth)acrylic syrup has a dynamic viscosity of a value in the range from 10 mPa*s to 10000 mPa*s, preferably from 50 mPa*s to 5000 mPa*s and advantageously from 100 mPa*s to 1000 mPa*s.

According to another aspect the impregnation process of the fibrous substrate of the present invention is made in a closed mold.

According to still another aspect the impregnation process of the fibrous substrate of the present invention is made with a liquid (meth) acrylic syrup that comprises a (meth)acrylic polymer which is a homo- or copolymer of methyl methacrylate (MMA) or a mixture thereof.

By the term "fibrous substrate" as used are denoted fabrics, felts or nonwovens that may be in the form of strips, laps, braids, locks or pieces.

By the term "(meth)acrylic" as used is denoted all kind of acrylic and methacrylic monomers.

By the term "PMMA" as used are denoted homo- and copolymers of methylmethacrylate (MMA), for the copolymer of MMA the weight ratio of MMA inside the PMMA is at least 70 wt %.

By the term "monomer" as used is denoted is a molecule which can under go polymerization.

By the term "polymerization" as used is denoted the process of converting a monomer or a mixture of monomers into a polymer.

By the term "thermoplastic polymer" as used is denoted a polymer that turns to a liquid or becomes more liquid or less viscous when heated and that can take on new shapes by the application of heat and pressure.

By the term "thermosetting polymer" as used is denoted a prepolymer in a soft, solid or viscous state that changes irreversibly into an infusible, insoluble polymer network by curing.

By the term "polymer composite" as used is denoted a multicomponent material comprising multiple different phase domains in which at least one type of phase domain is a continuous phase and in which at least one component is a polymer.

By the term "initiator" as used is denoted a chemical species that's reacts with a monomer to form an intermediate compound capable of linking successively with a large number of other monomers into a polymeric compound.

With regard to structured part or article this concerns a panel, a cover or a hull made of composite material or parts for aircrafts, for boats (hull and deck), rail cars (hatch, partition, body), and automotive parts (car body, hood, door.)

With regard to the (metha)acrylic polymer, one could mention poly alkyl methacrylates or poly alkyl acrylates. In a preferred embodiment the (meth)acrylic polymer is poly methyl methacrylate (PMMA).

The term "PMMA" denotes a methyl methacrylate (MMA) homopolymer or a copolymer or mixtures thereof.

In one embodiment the homo- or copolymer of methyl methacrylate (MMA) comprises at least 70%, preferably at least 80%, advantageously at least 90% and more advantageously at least 95% by weight of methyl methacrylate.

In another embodiment the PMMA is a mixture of at least one homopolymer and at least one copolymer of MMA, or a mixture of at least two homopolymers or two copolymers of MMA with a different average molecular weight or a mixture of at least two copolymers of MMA with a different monomer composition.

The copolymer of methyl methacrylate (MMA) comprises from 70% to 99.7% by weight of methyl methacrylate and from 0.3 to 30% by weight of at least one monomer having at least one ethylenic unsaturation that can copolymerize with methyl methacrylate.

These monomers are well known and mention may be made, in particular of acrylic and methacrylic acids and alkyl-(meth)acrylates in which the alkyl group has from 1 to 12 carbon atoms. As examples, mention may be made of methyl acrylate and ethyl, butyl or 2-ethylhexyl (meth) acrylate. Preferably the comonomer is an alkyl acrylate in which the alkyl group has from 1 to 4 carbon atoms.

In a preferred embodiment the copolymer of methyl methacrylate (MMA) comprises from 70% to 99.7%, preferably from 80% to 99.7% advantageously from 90% to 99.7% and more advantageously from 90% to 99.5% by weight of methyl methacrylate and from 0.3% to 30%, preferably from 0.3% to 20% advantageously from 0.3% to 10% and more advantageously from 0.5% to 10% by weight of at least one monomer having at least one ethylenic unsaturation that can copolymerize with methyl methacrylate. Preferably the comonomer is chosen from methyl acrylate or ethyl acrylate or mixtures thereof.

The weight average molecular weight of the (meth)acrylic polymer should be high, meaning larger than 50 000 g/mol, preferably larger than 100 000 g/mol.

The weight average molecular weight can be measured by size exclusion chromatography (SEC).

With regard to the (meth)acrylic monomer, the monomer is chosen from acrylic acid, methacrylic acid, alkyl acrylic monomers, alkyl methacrylic monomers and mixtures thereof.

Preferably the monomer is chosen from acrylic acid, methacrylic acid, alkyl acrylic monomers, alkyl methacrylic monomers and mixtures thereof, the alkyl group having from 1 to 22 carbons, either linear, branched or cyclic; preferably the alkyl group having from 1 to 12 carbons, either linear, branched or cyclic.

Advantageously the meth)acrylic monomer is chosen from methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

More advantageously the monomer is chosen (meth) acrylic monomer is chosen from methyl methacrylate, isobornyl acrylate or acrylic acid and mixtures thereof.

In a preferred embodiment at least 50 wt %, preferably at least 60 wt % of the monomer is methyl methacrylate.

In a more preferred embodiment at least 50 wt %, preferably at least 60 wt %, more preferably at least 70 wt % and advantageously at least 80 wt % and even more advantageously 90 wt % of the monomer is a mixture of methyl methacrylate with isobornyl acrylate and/or acrylic acid.

With regard to the fibrous substrate, one can mention fabrics, felts or nonwovens that may be in the form of strips, laps, braids, locks or pieces. The fibrous material can have different forms and dimensions either one dimensional, two dimensional or three dimensional. A fibrous substrate comprises an assembly of one or more fibres. When the fibres are continuous, their assembly forms fabrics.

The one dimensional form is linear long fibres. The fibers may be discontinuous or continuous. The fibers may be arranged randomly or as a continuous filament parallel to each other. A fiber is defined by its aspect ratio, which is the ratio between length and diameter of the fiber. The fibers used in the present invention are long fibers or continuous fibers. The fibers have an aspect ratio of at least 1000, preferably at least 1500, more preferably at least 2000, advantageously at least 3000 and most advantageously at least 5000.

The two dimensional form are fibrous mats or non woven reinforcements or woven roving or bundles of fibers, which can also be braded.

The three dimensional form are for example stacked or folded fibrous mats or non woven reinforcements or bundles of fibers or mixtures thereof, an assembly of the two dimensional form in the third dimension.

The origins of the fibrous material can be a natural or a synthetic one. As natural material one can mention vegetable fibers, wood fibers, animal fibers or mineral fibers.

Natural fibers are for example sisal, jute, hemp, flax, cotton, coconut fibers, and banana fibers. Animal fibers are for example wool or hair.

As synthetic material one can mention polymeric fibers chosen from fibers of thermosetting polymers, from thermoplastic polymers or their mixtures.

The polymeric fibers can be made of polyamide (aliphatic or aromatic), polyester, polyvinylacohol, polyolefins, polyurethanes, polyvinylchloride, polyethylene, unsatured polysters, epoxy resins and vinylesters.

The mineral fibers can also be chosen from glass fibers especially of type E, R or S2, carbon fibers, boron fibers or silica fibers.

The fibrous substrate of the present invention is chosen from vegetable fibers, wood fibers, animal fibers, mineral fibers, synthetic polymeric fibers, glass fibers, carbon fibers or mixtures thereof.

Preferably the fibrous substrate is chosen from mineral fibers.

With regard to the initiator or initiating system for starting the polymerization of the (meth) acrylic monomer, one could mention initiators or initiating systems that are activated by heat.

The heat activated initiator is preferably a radical initiator.

With regard to the radical initiator, they can be chosen from diacyl peroxides, peroxy esters, dialkyl peroxides, peroxyacetals or azo compounds.

The initiator or initiating system for starting the polymerization of the (meth) acrylic monomer is chosen from isopropyl carbonate, benzoyl peroxide, lauroyl peroxide, caproyl peroxide, dicumyl peroxide, tert-butyl perbenzoate, tert-butyl per(2-ethylhexanoate), cumyl hydroperoxide, 1,1-di(tert-butylperoxy)-3,3,5-trimethylcyclohexane, tert-butyl peroxyisobutyrate, tert-butyl peracetate, tert-butyl perpivalate, amyl perpivalate, tert-butyl peroctoate, azobisisobutyronitrile (AIBN), azobisisobutyramide, 2,2'-azobis(2,4-dimethylvaleronitrile) or 4,4'-azobis(4-cyanopentanoic). It would not be departing from the scope of the invention to use a mixture of radical initiators chosen from the above list.

Preferably the initiator or initiating system for starting the polymerization of the (meth) acrylic monomer is chosen from peroxides having 2 to 20 carbon atoms The content of radical initiator with respect to the (meth) acrylic monomer of the a liquid (meth) acrylic syrup is from 100 to 50000 ppm by weight (50000 ppm=5 wt %), preferably between 200 and 40000 ppm by weight and advantageously between 300 and 30000 ppm.

The (meth)acrylic monomer is typically one or more monomers as defined above with, optionally, a suitable inhibitor such as hydroquinone (HQ), methyl hydroquinone (MEHQ), 2,6-di-tertiary-butyl-4-methoxyphenol (Topanol O) and 2,4-dimethyl-6-tertiary-butyl phenol (Topanol A).

The inhibitor is present to prevent the monomer from spontaneously polymerising.

The liquid (meth) acrylic syrup comprises optionally also an activator for the polymerization.

Polymerisation activator or accelerator is chosen from tertiary amines such as N,N-dimethyl-p-toluidine (DMPT), N,N-dihydroxyethyl-p-toluidine (DHEPT), organic-soluble transition metal catalysts or mixtures thereof.

Advantageously the liquid (meth) acrylic syrup contains no metal based catalysts. No metal comprising additives as activators for catalytically accelerate the polymerization reaction are added to liquid (meth) acrylic syrup the liquid (meth) acrylic syrup according to the invention. These concerns especially tin based compounds as tin chloride.

The content of the activator with respect to the to the (meth)acrylic monomer of the liquid (meth) acrylic syrup is from 100 ppm to 10000 ppm (by weight), preferably from 200 ppm to 7000 ppm by weight and advantageously from 300 ppm to 4000 ppm.

The presence of activators or accelerators depends upon the final application. Where "cold-cure" is necessary or wished, an accelerator is usually necessary. Cold cure means that the polymerization takes place at ambient temperature, meaning less than 50° C. or preferably less than 40° C.

However, for industrial applications the use of heat in "heat-cure" systems is also possible.

Another ingredient in the liquid resin can also be a chain-limiting agent in order to control the molecular weight, for example γ-terpinene or terpinolene, at contents of between 0 and 500 ppm and preferably between 0 and 100 ppm, with respect to the monomers of the mixture.

The impregnation process according to the invention for impregnating a fibrous substrate comprises a step of impregnating the fibrous substrate with a liquid (meth)acrylic syrup.

A simple (meth)acrylic monomer or a (meth)acrylic monomer mixture as liquid (meth)acrylic syrup is too liquid for the impregnation process of the present invention, especially for the correct and complete wetting and impregnation of the fibrous substrate. Therefore the viscosity has to be adapted by increasing it.

With regard to the liquid (meth) acrylic syrup according to the invention that impregnates the fibrous substrate, it comprises a (meth)acrylic monomer or a mixture of a (meth)acrylic monomers, a (meth)acrylic polymer and at least one initiator or initiating system for starting the polymerization of the (meth) acrylic monomer.

According to the invention the viscosity is increased by using (meth)acrylic monomer or a mixture of a (meth) acrylic monomers with dissolved (meth)acrylic polymer or (meth)acrylic polymers. This solution is commonly referred to as "syrup" or "prepolymer".

Advantageously the liquid (meth) acrylic syrup contains no additionally voluntary added solvent.

The (meth)acrylic polymer is completely soluble in the (meth)acrylic monomer.

This (meth)acrylic polymer is PMMA, meaning the homo- or copolymer of methyl methacrylate (MMA) or a mixture thereof as defined before.

This (meth)acrylic monomer is the same as defined before.

The (meth)acrylic monomer or the (meth)acrylic monomers in the liquid (meth) acrylic syrup present at least 40% by weight, preferably 50% by weight, advantageously 60% by weight and more advantageously 65% by weight of total liquid (meth) acrylic syrup in view of (meth)acrylic monomer and (meth)acrylic polymer.

The (meth)acrylic monomer or the (meth)acrylic monomers in the liquid (meth) acrylic syrup present at most 90% by weight, preferably at most 85% by weight, advantageously at most 82% by weight and more advantageously at most 80% by weight of total liquid syrup in view of (meth)acrylic monomer and (meth)acrylic polymer.

The (meth)acrylic polymer or polymers in the liquid (meth) acrylic syrup present at least 10% by weight, preferable at least 15%, advantageously at least 18% and more advantageously at least 20% by weight of total liquid (meth) acrylic syrup in view of (meth)acrylic monomer and (meth) acrylic polymer.

The (meth)acrylic polymer or polymers in the liquid (meth) acrylic syrup present at most 60% by weight, preferable at most 50%, advantageously at most 40% and more advantageously at most 35% by weight of total liquid (meth) acrylic syrup.

The (meth)acrylic monomer or the (meth)acrylic monomers in the liquid (meth) acrylic syrup presents from 40% to 90% by weight, preferably from 50% to 90% by weight, advantageously from 55% to 85% by weight and more advantageously from 60% to 80% by weight of total liquid syrup in view of (meth)acrylic monomer and (meth)acrylic polymer.

Accordingly (meth)acrylic polymer or polymers in the liquid (meth) acrylic syrup presents from 60% to 10% by weight, preferably from 50% to 10% by weight, advantageously from 15% to 45% by weight and more advantageously from 20% to 40% by weight of total liquid syrup in view of (meth)acrylic monomer and (meth)acrylic polymer.

The dynamic viscosity of the liquid (meth) acrylic syrup is in a range from 10 mPa*s to 10000 mPa*s, preferably from 50 mPa*s to 5000 mPa*s and advantageously from 100 mPa*s to 1000 mPa*s. The viscosity of the syrup can be easily measured with a Rheometer or viscosimeter. The dynamic viscosity is measured at 25° C. The liquid (meth) acrylic syrup has a Newtonian behaviour, meaning no shear thinning, so that the dynamic viscosity is independent of the shearing in a rheometer or the speed of the mobile in a viscosimeter.

If the viscosity of the liquid (meth) acrylic syrup at a given temperature is too high for the impregnation process and for the correct impregnation, it is possible to heat the syrup in order to have a more liquid syrup within the before mentioned dynamic viscosity interval at the respective temperature during which the impregnation takes place for the sufficient wetting and correct and complete impregnation of the fibrous substrate.

The liquid syrup according to the present invention does not contain any additional solvent voluntary added.

The liquid (meth) acrylic syrup may comprise also other additives and fillers. A filler in the scope of the present invention is not considered as an additive.

All the additives and fillers can be added to the liquid (meth) acrylic syrup before the impregnation.

As additives one can mention organic additives as impact modifiers or block copolymers, thermal stabilizers, UV stabilizers, lubricants and mixtures thereof.

The impact modifier is in the form of fine particles having an elastomeric core and at least one thermoplastic shell, the size of the particles being in general less than 1 µm and advantageously between 50 and 300 nm. The impact modifier is prepared by emulsion polymerization. The impact modifier content in the liquid (meth) acrylic syrup is from 0 to 50 wt %, preferably from 0 to 25 wt %, and advantageously from 0 to 20% by weight.

As fillers one can mention carbon nanotubes or mineral charges including mineral nano charges (TiO2, silica).

The filler content in the liquid (meth) acrylic syrup is from 0 to 20 wt %.

An additional aspect according to the present invention is the impregnation process, for impregnating a fibrous substrate, wherein said fibrous substrate is made of long fibres and said process comprises a step of impregnating said fibrous substrate with a liquid (meth) acrylic syrup comprising:
 a) from 10 wt % to 59.99 wt % (meth)acrylic polymer,
 b) from 40 wt % to 89.99 wt % (meth)acrylic monomer,
 c) from 0.01 wt % to 5 wt % one initiator or initiating system for starting the polymerization of the (meth) acrylic monomer,
 d) from 0 wt % to 1 wt % activator,
 e) from 0 wt % to 20 wt % filler,
 f) from 0 wt to 20 wt % additives.

Another additional aspect according to the present invention is the impregnation liquid (meth) acrylic syrup for implementing the impregnation process according to any of the preceding claims, said liquid (meth) acrylic syrup comprises
 a) a (meth)acrylic polymer,
 b) a (meth)acrylic monomer,
 c) at least one initiator or initiating system for starting the polymerization of the (meth) acrylic monomer,
said liquid (meth)acrylic syrup has a dynamic viscosity of a value in the range from 10 mPa*s to 10000 mPa*s, preferably from 50 mPa*s to 5000 mPa*s and advantageously from 100 mPa*s to 1000 mPa*s.

Still another additional aspect according to the present invention is an impregnation liquid (meth) acrylic syrup comprising:
 from 10 wt % to 59.99 wt % (meth)acrylic polymer,
 from 40 wt % to 89.99 wt % (meth)acrylic monomer,
 from 0.01 wt % to 5 wt % one initiator or initiating system for starting the polymerization of the (meth) acrylic monomer,
 from 0 wt % to 1 wt % activator,
 from 0 wt % to 20 wt % fillers,
 from 0 wt to 20 wt % additives.

Still another aspect of the present invention is a manufacturing process for manufacturing mechanical or structured parts or articles comprising following steps:
 a) impregnating a fibrous substrate with a liquid (meth) acrylic syrup,
 b) polymerising the liquid (meth) acrylic syrup impregnating said fibrous substrate.

Preferably the impregnation of the fibrous substrate in step
 a) is made in a closed mold.

Advantageously the step a) and step b) are made in the same closed mould.

The mold is opaque towards visible and ultraviolet radiation at least on one side A closed mold will amongst other things avoid and reduce the evaporation of the monomer and protect the environment.

Using the same closed mold will avoid the transfer of the material after impregnation and polymerizing in a closed mold will guarantee a good distribution of the heat, having a satisfying yield of polymerization and eventually evaporation of the monomer(s).

No metals are present in manufactured mechanical or structured parts or articles such as tin are present coming from accelerators added for the polymerization step.

The manufactured mechanical or structured parts or articles do not contain any additional solvent voluntary added, since the syrup did not contain any additional solvent for the impregnation step.

With regard to the manufactured mechanical or structured parts or articles of the present invention, it comprises at least 20% by weight of fibrous substrate, preferable at least 40% by weight of fibrous material advantageously at least 50% by weight of fibrous material and advantageously at least 55% by weight of fibrous material based on the total composition.

The manufactured mechanical or structured parts or articles of the present invention, it comprises at most 99% by weight of fibrous material, preferable at most 95% by weight of fibrous material advantageously at most 90% by weight of fibrous material and advantageously at most 80% by weight of fibrous material based on the total composition.

Due to the manufacturing process for manufacturing mechanical or structured parts or articles according to the invention a complete, correct and homogenous wetting of the fibrous substrate during impregnation takes place. There are no defects of fiber wetting during impregnation for example by bubbles and voids that decrease the mechanical performance of the manufacturing mechanical or structured parts or articles.

The manufactured mechanical or structured parts or articles according to the invention do not comprise essentially any pores. By pore is meant a spherical void with a diameter of at least 1 μm or larger or an elongated ellipsoidal void in form of an oblate with a smallest principal axe of at least 0.5 μm or larger. By "comprising essentially no pores" is meant that the pores represent less then 1 vol %, preferably less then 0.5 vol % and more preferably less then 0.2 vol % of the total volume of the manufactured mechanical or structured parts or articles.

With regard to manufacturing process for manufacturing mechanical or structured parts or articles comprising the polymeric composite material, several methods could be used in order to prepare three-dimensional mechanical or structured parts. One can mention infusion, vacuum bag moulding, pressure bag molding, autoclave molding, resin transfer moulding (RTM), reaction injection molding (RIM) reinforced reaction injection molding (R-RIM) and variants thereof, press molding or compression molding.

The preferred manufacturing process for manufacturing mechanical or structured parts or articles comprising the composite materials are processes were the liquid (meth) acrylic syrup transferred to the fibrous substrate by impregnating the fibrous substrate in a mold more preferably in a closed mold.

Advantageously the impregnation step of the fibrous material is made in a closed mold.

Most advantageously the manufacturing process for manufacturing mechanical or structured parts or articles comprising the polymeric composite material is chosen from resin transfer molding or infusion.

All processes comprise the step of impregnating the fibrous substrate with the liquid (meth) acrylic syrup before the polymerization step in a mold.

The step of polymerising of the liquid (meth) acrylic syrup impregnating said fibrous substrate takes place after the impregnation step in the same mold.

Resin transfer molding is a method using a two sided mold set which forms both surfaces of composite material. The lower side is a rigid mould. The upper side can be a rigid or flexible mould. Flexible moulds can be made from composite materials, silicone or extruded polymer films such as nylon. The two sides fit together to produce a mould cavity. The distinguishing feature of resin transfer moulding is that the fibrous substrate is placed into this cavity and the mould set is closed prior to the introduction of the liquid (meth) acrylic syrup. Resin transfer moulding includes numerous varieties which differ in the mechanics of how the liquid (meth) acrylic syrup is introduced to the fibrous substrate in the mould cavity. These variations include everything from vacuum infusion to vacuum assisted resin transfer moulding (VARTM). This process can be performed at either ambient or elevated temperature. Ambient temperature means between 10° C. and 50° C. Elevated temperature means up to 200° C. Preferably elevated temperature is from 50° C. up to 160° C.

With the infusion method the liquid (meth) acrylic syrup does have to have the adapted viscosity towards this preparation method of the polymeric composite material. The liquid (meth) acrylic syrup is aspired into the fibrous substrate present in a special mold by application of a slight vacuum. The fibrous substrate is infused and completely impregnated by the liquid (meth) acrylic syrup.

One advantage of this method is the high amount of fibrous material in the composite.

With regard to the use of manufactured mechanical or structured parts or articles, one can mention automotive applications, nautical applications, railroad applications, sport, aeronautic and aerospace applications, photovoltaic applications, computer related applications, telecommunication applications and wind energy applications.

Particularly the three-dimensional mechanical or structured part is a automobile part, boat part, train part, sport article, plane or helicopter part, space ship or rocket part, photovoltaic module part, wind turbine part, furniture part, construction or building part, telephone or cell phone part, computer or television part, printer and photocopy part.

With regard to the recycling of the structured part, comprising the thermoplastic composite material it can be made by grinding or depolymerization of the thermoplastic polymer.

Grinding is made mechanically in order to obtain smaller parts of pieces. As the structured part compromises thermoplastic polymer, this polymer can be heated, and the pieces again transformed in a certain limit in order to obtain a recycled object.

Preferably the structured part comprising the thermoplastic composite is heated for making a pyrolysis or thermal decomposition of the PMMA and recovering the methyl methacrylate as monomer.

Advantageously at least 50 wt % of the MMA present in the polymer are recovered by thermal decomposition.

The structured part is heated at a temperature of at least 200° C. and no more than 400° C.

So, a final subject of the present invention relates to the use of the impregnation process or of the manufacturing process according to the invention, particularly when the said methacrylic polymer is an homopolymer or/and a copolymer of methyl methacrylate, in the manufacture of mechanical and/or structural parts which are recyclable by thermal depolymerisation (by means of pyrolysis), preferably with at least 50% of the monomers, particularly of methyl methacrylate (MMA) recovered.

EXAMPLES

Example 1

A syrup is prepared by dissolving 25 parts by weight of the PMMA (BS520 a copolymer of MMA comprising ethyl acrylate as a comonomer) in 75 parts by weight of methyl methacrylate, which is stabilized with MEHQ (hydroquinone monomethyl ether). To the 100 parts by weight of the syrup are added 2 parts by weight of benzoyl peroxide (BPO—Luperox A75 from ARKEMA) and 0.2 parts by weight of DMPT (N,N-dimethyl-p-toluidine from Sigma-Aldrich). The syrup has a dynamic viscosity of 520 mPa*s at 25° C. The syrup is injected in a closed mould comprising a glass fabric as fibrous substrate and polymerized at 25° C. during 80 minutes.

A structural part in form of a sheet is obtained from the mould.

The sheet has a good adherence of the thermoplastic polymer to the fibrous substrate.

The sheet possesses also satisfying mechanical properties.

After utilisation the structural part in form of a sheet can be recycled by heating and depolymerisation.

The invention claimed is:

1. An impregnation process for impregnating a fibrous substrate to form a thermoplastic composite material comprising at least 20 percent by weight of said fibrous material, wherein said fibrous substrate is made of long fibres having an aspect ratio of at least 1000 and said process comprises a step of impregnating said fibrous substrate with a liquid (meth) acrylic syrup in a closed mold, said (meth)acrylic syrup comprising:
   a) from 40 weight percent to 89.99 weight percent (meth) acrylic monomer, based on the sum of (meth)acrylic monomer plus (methacrylic polymer,
   b) from 10 weight percent to 59.99 weight percent (meth) acrylic polymer, based on the sum of (meth)acrylic monomer plus (methacrylic polymer, containing at least 90% by weight of methyl methacrylate and dissolved in said (meth)acrylic monomer,
   c) from 0.01 weight percent to 5 weight percent of one initiator or initiating system for starting the polymerization of the (meth) acrylic monomer, based on (methacrylic monomer,
   d) from 300 ppm to 4000 ppm activator, based on (meth) acrylate monomer, wherein said activator is selected from the group consisting of tertiary amines, N,N-dimethyl-p-toluidine (DMPT), N,N-dihydroxyethyl-p-toluidine (DHEPT), organic-soluble transition metal catalysts and mixtures thereof,
   e) from 0 weight percent to 20 weight percent filler, based on the liquid (meth)acrylic syrup,
   f) from 0 weight percent to 20 weight percent additives, based on the liquid (meth)acrylic syrup;
said liquid (meth)acrylic syrup has a dynamic viscosity of a value in the range from 10 mPa*s to 10000 mPa*s.

2. The impregnation process according to claim 1, wherein said (meth)acrylic polymer is a homopolymer of methyl methacrylate (MMA), a copolymer of methyl methacrylate (MMA) comprising at least 90% by weight, of methyl methacrylate (MMA), or a mixture of MMA homopolymers, one or more MMA homopolymers with one or more MMA copolymers comprising at least 90% by weight, of methyl methacrylate (MMA), or two or more MMA copolymers each comprising at least 90% by weight, of methyl methacrylate (MMA).

3. The impregnation process according to claim 2, wherein said copolymer of methyl methacrylate (MMA) comprises at least 95% by weight of methyl methacrylate (MMA).

4. The impregnation process according to claim 1, wherein said (meth)acrylic polymer is a copolymer of methyl methacrylate (MMA) comprising from 90% to 99.7% by weight of methyl methacrylate and from 0.3 to 10% by weight of at least one monomer having at least one ethylenic unsaturation that can copolymerize with methyl methacrylate.

5. The impregnation process according to claim 1, wherein said (meth)acrylic polymer comprises a comonomer, said comonomer is an alkyl acrylate having an alkyl group from 1 to 12 carbon atoms.

6. The impregnation process according to claim 5, wherein said comonomer is chosen from methyl acrylate or ethyl acrylate and a mixture thereof.

7. The impregnation process according to claim 1, wherein said (meth)acrylic monomer is one or more monomers selected from the group consisting of acrylic acid, methacrylic acid, alkyl acrylic monomers, alkyl methacrylic monomers and mixtures thereof, the alkyl group having from 1 to 22 carbons, either linear, branched or cyclic.

8. The impregnation process according to claim 7, wherein said (meth)acrylic monomer is selected from the group consisting of methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

9. The impregnation process according to claim 8, wherein said (meth)acrylic monomer is chosen from methyl methacrylate, isobornyl acrylate or acrylic acid and mixtures thereof.

10. The impregnation process according to claim 1, wherein at least 50 weight percent of the (meth)acrylic monomer is methyl methacrylate.

11. The impregnation process according to claim 1, wherein said initiator or initiating system for starting the polymerization of the (meth) acrylic monomer is selected from the group consisting of diacyl peroxides, peroxy esters, dialkyl peroxides, peroxyacetals, azo compounds, isopropyl carbonate, benzoyl peroxide, lauroyl peroxide, caproyl peroxide, dicumyl peroxide, tert-butyl perbenzoate, tert-butyl per(2-ethylhexanoate), cumyl hydroperoxide, 1,1-di(tert-butylperoxy)-3,3,5-trimethylcyclohexane, tert-butyl peroxyisobutyrate, tert-butyl peracetate, tert-butyl perpivalate, amyl perpivalate, tert-butyl peroctoate, azobisisobutyronitrile (AIBN), azobisisobutyramide, 2,2'-azobis(2,4-dimethylvaleronitrile) or 4,4'-azobis(4-cyanopentanoic) and mixtures thereof.

12. The impregnation process according to claim 1, wherein said initiator or initiating system for starting the polymerization of the (meth) acrylic monomer is selected from the group consisting of peroxides having 2 to 20 carbon atoms.

13. The impregnation process according to claim 1, wherein said initiator or initiating system for starting the polymerization of the (meth) acrylic monomer represents from 100 to 50000 ppm by weight with respect to the (meth)acrylic monomer.

14. The impregnation process according to claim 1, wherein said (meth)acrylic polymer in the liquid (meth) acrylic syrup is present at from at least 10% by weight to 50% by weight of total liquid (meth) acrylic syrup.

15. The impregnation process according to claim 1, wherein said (meth)acrylic monomer in the liquid (meth) acrylic syrup is present at from 55% to 85% by weight of total liquid (meth) acrylic syrup.

16. The impregnation process according to claim 1, wherein said liquid (meth) acrylic syrup further comprises additives selected from the group consisting of fillers, impact modifiers, block copolymers, thermal stabilizers, UV stabilizers, flame retardants, lubricants and mixtures thereof.

* * * * *